(12) United States Patent
Billman

(10) Patent No.: US 8,730,039 B1
(45) Date of Patent: *May 20, 2014

(54) SYSTEMS AND METHODS FOR RECORDING AND USING INFORMATION ABOUT CONDITIONS PRESENT IN A HOUSE OR OTHER LOCATION

(71) Applicant: United Services Automobile Association (USAA), San Antonio, TX (US)

(72) Inventor: Bradly J. Billman, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/653,010

(22) Filed: Oct. 16, 2012

Related U.S. Application Data

(63) Continuation of application No. 12/474,551, filed on May 29, 2009, now Pat. No. 8,289,160.

(51) Int. Cl.
*G08B 21/00* (2006.01)

(52) U.S. Cl.
USPC ........................................................ 340/540

(58) Field of Classification Search
USPC .............. 340/540, 539.1, 628, 531, 584, 602; 705/4; 702/183
See application file for complete search history.

(56) References Cited

U.S. PATENT DOCUMENTS

| | | | | |
|---|---|---|---|---|
| 5,421,204 A | * | 6/1995 | Svaty, Jr. .......................... | 73/786 |
| 5,680,329 A | * | 10/1997 | Lloyd et al. ................... | 700/275 |
| 5,950,150 A | | 9/1999 | Lloyd et al. | |
| 2004/0039503 A1 | | 2/2004 | Doyle | |
| 2005/0055248 A1 | * | 3/2005 | Helitzer et al. ................... | 705/4 |
| 2007/0182544 A1 | | 8/2007 | Benson et al. | |
| 2008/0065427 A1 | * | 3/2008 | Helitzer et al. ................... | 705/4 |
| 2008/0184272 A1 | * | 7/2008 | Brownewell .................. | 719/318 |
| 2008/0282817 A1 | * | 11/2008 | Breed .......................... | 73/865.9 |
| 2009/0043441 A1 | | 2/2009 | Breed | |

OTHER PUBLICATIONS

Schmid, Thomas, et al. "SensorScope: Experiences with a Wireless Building Monitoring Sensor Network", Ecole Polytechnique F'ed'erale de Lausanne, 5 pgs., Jun. 2005.

Palmer, W. Scott, "Black Box Technology and its Implications for Auto Insurance", Claims Covering the Business of Loss, Aug. 2002, 3 pgs.

\* cited by examiner

*Primary Examiner* — Phung Nguyen
(74) *Attorney, Agent, or Firm* — Brooks, Camerson & Huebsch, PLLC

(57) ABSTRACT

A data recorder may be installed in a house or other type of building in order to record conditions present at the building. The data recorded may be analyzed in order to forensically assess conditions that have led to damage or destruction of the building, or to prospectively forecast the possibility of future damage or destruction. A decision may be made based on analysis of the data, and an action may be taken based on the decision. Examples of data that may be recorded include temperature, wind speed, humidity, or any other information. Examples of decisions that may be made include insurance claim decisions, underwriting decisions, reinsurance decisions, alert decisions, or any other types of decisions.

20 Claims, 4 Drawing Sheets

SYSTEMS AND METHODS FOR RECORDING AND USING INFORMATION ABOUT CONDITIONS PRESENT IN A HOUSE OR OTHER LOCATION

CROSS-REFERENCE TO RELATED APPLICATION(S)

This application is a continuation of U.S. patent application Ser. No. 12/474,551, filed May 29, 2009, now U.S. Pat. No. 8,289,160, which is herein incorporated by reference.

BACKGROUND

Houses and other buildings may be damaged or destroyed by a variety of events, and under a variety of circumstances. For example, a house could be destroyed by fire; by motion resulting from seismic activity; by the wind force of a hurricane; by flooding; or by various other mechanisms. There may be reason to assess the way in which the house was damaged or destroyed. For example, to say that a house was destroyed by a hurricane provides very little information. Some houses may be able to withstand higher wind speeds than other houses can. Or, some houses may withstand hurricane winds for a longer time than others can before succumbing to the force of the wind. Moreover, hurricane winds destroy houses in different ways. In some cases, the destruction starts when the winds rip the roof off the house, while other houses explode when the wind causes a pressure gradient to form between the inside and outside of the house.

Similarly, other types of events can destroy or damage a house, and the destruction or damage could occur in a variety of ways. For example, an earthquake can damage a house by exerting mechanical pressure on the supporting structures of the house, or by cracking the foundation, or by rupturing a gas main and thereby starting a fire.

SUMMARY

A data recorder may be installed in a house in order to measure and/or record conditions and/or events present at the house. For example, the data recorder may record information such as temperature, humidity, wind speed, mechanical vibrations, or any other factors. The information captured by the recorder may be used to analyze an event that causes damage or destruction to the house. Or, the information may be used to analyze conditions that are present at the house, in advance of any actual damage event.

For example, if a hurricane strikes the area in which the house is located, the recorder may capture the wind speed, temperature, and movement at various points in time. If the house is destroyed or damaged, it may be possible to determined, from the recorded data, the actual mechanism by which the house was destroyed, and/or how long the house withstood the hurricane-force winds. For example, motion is detected at a recorder that is affixed to the house, this motion may indicate a catastrophic failure of the house's structure. Thus, sustained winds of over one hundred miles per hour, followed by a sudden increase in motion, may indicate that the house withstood the winds for some number of hours and then gave way. On the other hand, the same sustained winds followed by a rapid increase in temperature may suggest that the hurricane caused a fire (e.g., by breaking a gas main), and the fire ultimately destroyed the house. Various types of information may be collected by the recorder, and the information may be used to learn, in some detail, about the event that damaged or destroyed the house. This analysis may be used to understand future risks, or may be used to assess whether an insurance claim is to be paid.

In addition to collecting data that allows for forensic analysis of damage, the recorder may also be used to collect information about conditions that are present at a house in advance of any actual damage. For example, the recorder might record the wind speed at the house, in order to get a picture of the average wind speed over a period of months. If there is a trend toward a higher wind speed, this fact may suggest an increased likelihood of damage (e.g., trees may be more likely to fall in the presence of higher winds). An insurance company could use this information to plan for future losses. As another example, the recorder could collect humidity readings, where a trend toward higher humidity may indicate an increased likelihood of mould damage. An insurance company could use this information to plan for future losses, or—even if an insurance policy does not cover mould damage—the insurance company could provide a service to its policyholder by warning the policyholder of the gathering potential for mould damage.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

DETAILED DESCRIPTION

Figure 1:
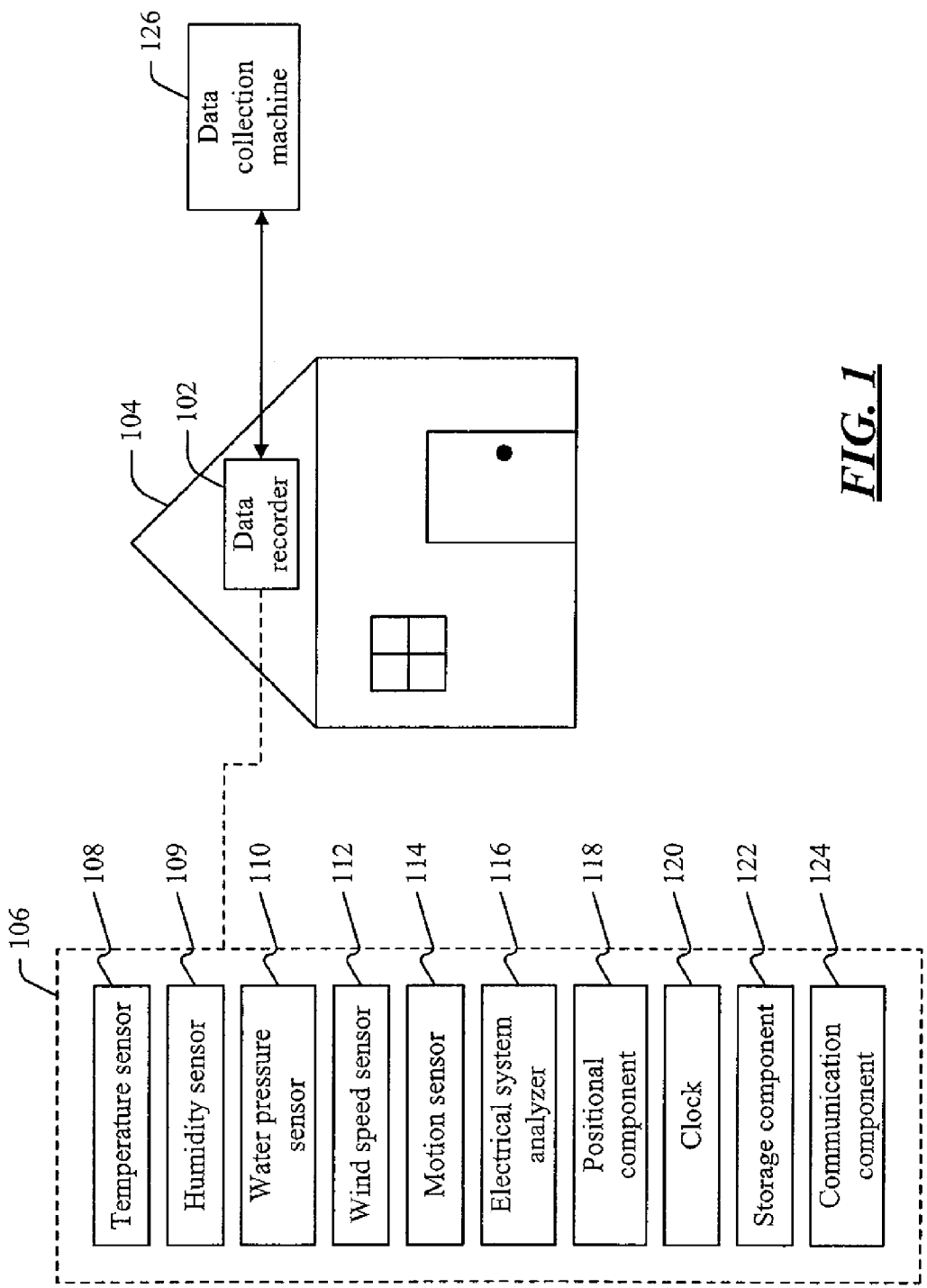
FIG. 1 is a block diagram of an example building in which a data recorder may be used.

Many aircraft have a flight data recorder, or "black box", which records certain information about the aircraft, such as altitude, airspeed, heading, attitude, etc. Typically, an aircraft's black box continuously records a half-minute window of data, so that at any point in time the last half-minute of data can be read from the black box. Analysis of this data allows certain aspects of a crash to be reconstructed or inferred. The analysis may be used to determine how the crash occurred, which analysis may use to help prevent future crashes.

Aircraft are one of the first places in which such a data recorder has been used. However, data recorders have not been used in house or other buildings. The damage or destruction of a building is an event that could be analyzed. For example, if a building is damaged or destroyed in a hurricane, one might want to know what wind speed was present at the time of damage or destruction, and for how long hurricane-force winds were present. This type of information could be used to determine, forensically, how wind-resistant the building is. Or, if the building is destroyed by a hurricane (in which both wind and rain are present), an insurance company might want to know whether the building was destroyed by the rain or by the wind, since insurance might work differently for these different causes of damage. Or, as another example, conditions that might damage a building may be gathering over time—e.g., changes in temperature or humidity over time may be creating conditions for a concrete foundation to rot, and the owner of the building could be warned if the temperature and humidity data are used to make a forecast of the danger.

The subject matter described herein provides a data recorder that may be used to collect data about a building. The data may be used forensically to analyze events that have damaged or destroyed the building. Or, the data may be used to forecast a gathering danger to the building. An insurance carrier may be particularly interested in these types of data, since the data may help the insurance carrier to understand risk when writing new policies, or may help the carrier to plan for future losses of its existing insured properties. For example, when a house experiences a hurricane, analyzing what conditions were present during the hurricane (e.g., wind speed, amount of rain, temperature, etc.) for houses that survived with no damage, and performing a similar analysis for houses that experienced damage or destruction, may help the insurance carrier to understand how houses respond to hurricanes, which may help the carrier to underwrite future risks. Or, the carrier may be interested in whether the hurricane destroyed the house by flooding or by wind, since these risks may be insured differently (e.g., wind damage may be the carrier's responsibility, while flooding may be the federal government's responsibility). Or, as another example, the carrier may observe that the prevailing wind speed in the vicinity of the house is increasing, and the carrier may use this information to plan for future losses even if none have occurred. Moreover, if the carrier becomes aware of an additional risk to the house (such as an increased wind speed), the carrier might, as a service to its insured, inform the insured of the risk and recommend protective action (such as reinforcing the windows, removing trees that are near to the house, etc.).

In the foregoing examples, a data recorder records conditions such as wind speed, temperature, rainfall, and humidity. However, any type of information could be recorded. Some additional examples of data are described subsequently, although the subject matter herein is not limited to the recordation or use of any particular type of data. Moreover, the foregoing examples describe the use of recorded data in the context of insurance underwriting, although data could be recorded and/or used for any purpose.

Turning now to the drawings, FIG. 1 shows an example building in which a data recorder 102 may be used. In the example of FIG. 1, the building is shown as a house 104, although data recorder 102 could be stored in any type of building. Moreover, in the example of FIG. 1, data recorder 102 is shown as being stored near the top of house 104 (e.g., in the attic). Storing data recorder 102 at a high location in the building may help to prevent data recorder 102 from being buried underground in the event that house 104 collapses, and thus this location may aid in recovery of data recorder 104 after a catastrophe. However, data recorder 102 could be stored in any location, and its position is not limited to the example shown.

Data recorder 102 may comprise, or otherwise may make use of, various components 106. Some examples of components 106 are shown in FIG. 1, although the list of components 106 that is shown in FIG. 1 is not intended to be exhaustive; the subject matter herein applies to any type of data recorder 102, regardless of the type of components that are employed.

In the example shown, components 106 may include a temperature sensor 108. Temperature sensor 108 may detect the temperature present at the building. For example, the temperature may rise and fall with the change of seasons and/or the time of day. Moreover, in the event of a fire, the temperature present at the building may rise quickly—possibly to a level of extreme high heat. Temperature sensor 108 may make use of probes placed at various locations in and around the building, in order to collect a representative profile of the temperature present at the building. These probes may be connected to data recorder 102 by wire, or by a wireless technology. For example, if data recorder 102 is positioned in the attic of the building, the temperature may be higher than the general temperature present in the building. Thus, probes placed at various locations (e.g., in the basement, on the various levels of a multi-level building, in different rooms that receive different amounts of sun, etc.), in order to obtain an accurate picture of the temperature present at the building. Moreover, data recorder 102 may record both the indoor and outdoor temperature present at the building. For example, data about the indoor temperature, the outdoor temperature, and/or the differential between indoor and outdoor temperatures, may be used as part of some analysis model, and thus all of the different values could be stored. Data recorder 102 may store an abstract representation of temperature (e.g., the average indoor temperature, as collected at all of the probes), or may store each temperature reading individually so that the individual readings may be provided as input to an analysis model.

Humidity sensor 109 may detect the humidity present at the building. Humidity sensor may comprise the humidity-detection hardware, or may employ one or more remote probes, which may be located inside and/or outside the building. Humidity readings from one or more locations inside and/or outside the building could thus be recorded by data recorder 102.

Water pressure sensor 110 may monitor water pressure in the plumbing system in the building. Water pressure sensor 110 may have one or more probes attached to various locations of the building's plumbing, and thus data recorder 102 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, data recorder 102 may record the water pressure that is present in the plumbing system at various points in time.

Wind speed sensor 112 may record the wind speed present at the building. For example, one or more wind sensors may be placed outside the building, at the wind speed and/or direction may be recorded at various points in time. Data recorder 102 may record these wind speed and/or wind direction readings. The wind speed may be used by an analysis model for various purposes. For example, the wind speed and/or direction at specific points in time during a hurricane may help to understand how well the building withstood a hurricane. If the wind speed rises to a certain level just before a house is destroyed in a hurricane, this fact may be used to estimate the amount of wind that the house could withstand. Or, as another example, measurements of wind speed and/or direction taken at a time other than when a hurricane is occurring could be used to forecast the risk that a house will suffer damage. Even non-hurricane-force winds can cause damage to a building, and an insurer might be interested to know if the prevailing wind speed in the vicinity of the building is increasing or decreasing. This information could be used to plan for future losses and/or to make future underwriting decisions.

Motion sensor 114 may sense motion in the building to which data recorder 102 is attached. Typically, buildings do not move significantly, except in the event of a catastrophe.

Motion may indicate that the building is sliding down a hill (e.g., in the event of an extreme flood or mudslide), or is experiencing a measurable earthquake. Moreover, in the event of a complete collapsed, it is likely that data recorder 102 (or a motion sensor probe used by data recorder 102) will move, and thus such motion could be used to identify the moment at which the building collapsed. An analysis model could use the information about motion in various ways. For example, if an abrupt motion indicates that the building collapsed at a certain point in time, then data such as temperature, wind speed, etc., could be used to determine what was happening (e.g., fire, high winds, etc.) at the time of the collapse. This information may be used to understand the cause of the collapse. Or, as another example, the information could be used to assess an insurance claim (e.g., an insurer's liability for wind damage might be different than for fire damage, and thus knowing what was happening at the moment of the collapse might be used to determine what, if any, settlement is due to an insured).

Electrical system analyzer 116 may be used to assess the condition of the building's electrical system. For example, potentiometers may be connected to various points in the building's electrical system to measure voltage. Readings from the potentiometers could be used to determine if the voltage is persistently too high, or too low, or if the voltage frequently drops and/or spikes. Such conditions may suggest that the building it at risk for fire. Other types of electrical measurements could be taken, such as readings of current flowing through the electrical system. Any type of data about the building's electrical system could be stored by data recorder 102.

Positional component 118 may record the position of data recorder 102. For example, positional component 118 may be, or may comprise, a Global Positioning System (GPS) receiver, which may allow the position of data recorder 102 to be determined. Or, as another example, positional component 118 may use triangulation technology that communicates with fixed points (such as wireless communication towers) to determine its position. While a building normally does not move, positional component 118 may allow data recorder 102 to be recovered in the event of a catastrophe. For example, if a building explodes, or is otherwise catastrophically damaged, data recorder 102 may be propelled to an unknown location. Positional component 118 may record the position of data recorder 102, which data recorder 102 could communicate to an external source, thereby allowing data recorder 102 to be found.

Clock 120 may keep track of time for data recorder 102, thereby allowing a given item of data to be associated with the time at which the data was captured. For example, data recorder 102 may recurrently capture readings of temperature, wind speed, humidity, etc., and may timestamp each reading. The time at which the readings are taken may be used to reconstruct events. For example, the timestamps on wind speed readings taken during a hurricane may allow it to be determined, after the hurricane has occurred, how quickly the wind speed rose in the vicinity of the building.

Storage component 122 may be used to store data readings and/or timestamps in data recorder 102. For example, storage component 122 may comprise, or may otherwise make use of, magnetic or optical disks, volatile random-access memory, non-volatile random-access memory, or any other type of storage device. There may be sufficient data storage capacity to store several hours or several days worth of readings. For example, the sever part of a hurricane might last for half a day, a full day, or several days. Storage component 122 might have sufficient storage capacity to allow twelve or more hours of readings to be stored, thereby allowing forensic reconstruction of how the hurricane affected the building during the full time that the building was experiencing the hurricane's impact.

Communication component 124 may be used to communicate recorded information from data recorder 102 to an external location. Communication component 124 may be, or may comprise, a network communication card such as an Ethernet card, a WiFi card, or any other communication mechanism. However, communication component 124 could take any form and is not limited to these examples. Communication component 124 might encrypt data that it communicates, in order to protect the security and/or privacy of the data. Communication component may communicate data recorded by data recorder 102 (e.g., data stored in storage component 122) to an external location, such as data collection machine 126. For example, data collection machine 126 may be operated by an insurance company, and may collect data from data recorder 102 in order to learn about risks to the building in which data recorder 102 is located. Communication component 124 may initiate communication sessions with data collection machine 126. Or, as another example, data collection machine 126 may contact data recorder 102, through communication component 124, in order to receive data that has been stored by data recorder 102.

Figure 2:
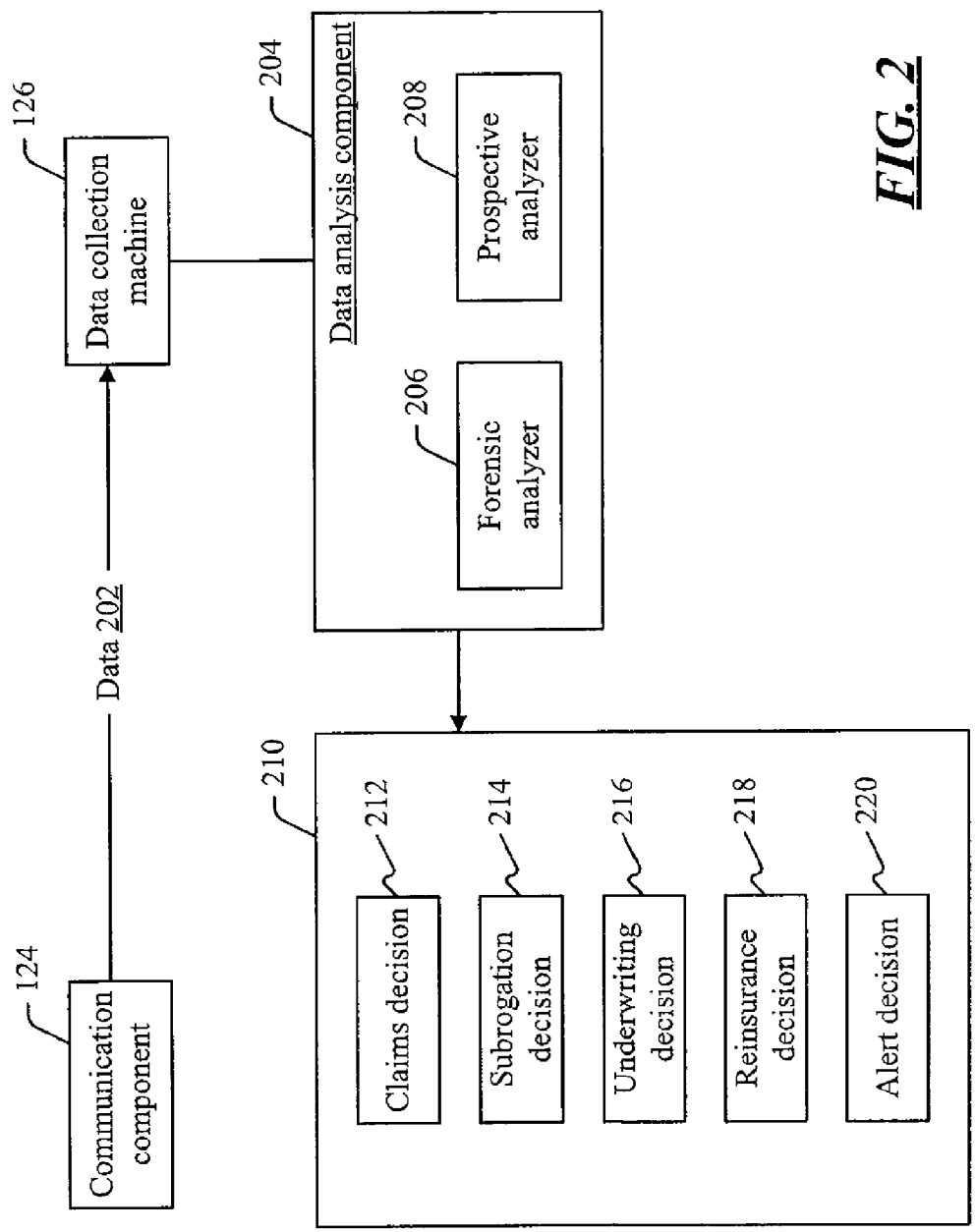
FIG. 2 is a block diagram of an example scenario in which a data collection machine receives data, and in which the data is used.

As previously noted, data recorder 102 may communicate its data to a data collection machine 126. FIG. 2 shows an example in which data collection machine 126 receives such data, and in which the data is used in various ways.

In the example of FIG. 2, communication component 124 (which is shown, in FIG. 1, as being part of, or used by, data recorder 102) communicates data 202 to data collection machine 126. Data collection machine 126 may comprise, or otherwise may cooperate with, a data analysis component 204, which may analyze data 202 in some manner. Data analysis component 204 may comprise various types of sub-components, such as forensic analyzer 206 and prospective analyzer 208. In general, forensic analyzer 206 may perform a post hoc analysis, such as that used to understand the details of how a building was damaged or destroyed during a hurricane, a fire, etc. Moreover, in general prospective analyzer 208 may analyze data to assess the risk of destruction and/or damage that has not yet happened. Forensic analyzer 206 and prospective analyzer 208 may overlap somewhat in terms of the techniques they employ—e.g., both of these sub-components may analyze facts such as temperature, wind speed, etc., and attempt to draw some conclusions based on whether and/or how these facts have changed over time.

The analysis performed by data analysis component 204 may be used to make various types of decisions 210. FIG. 2 shows some examples of decisions 210 that may be made based on analysis, although the specific decisions 210 that are shown do not constitute an exhaustive list. Any type of decision may be made.

One type of decision that may be made is a claims decision 212. For example, if a claim is made against an insurance policy, whether the claim is to be paid (or the amount of the claim to be paid) may depend on how a building was damaged or destroyed. Many homeowner's insurance policies insure against fire and earthquake differently (e.g., some policies cover fire but not earthquake), so if an earthquake strikes and a building is found collapsed and burnt, there are at least two possibilities as to how the building arrived in its current condition: (1) the building collapsed from the earthquake and then its collapsed remains burnt, or (2) the earthquake started a fire that burnt the building, and the burnt remains collapsed. If fire is a covered risk and earthquake is not, then it may be relevant to determine whether (1) or (2) is what happened, since (2) would be a covered loss event and (1) would not be a covered loss event. Thus, analysis of data from a data recorder may be used to determine how a building was damaged or destroyed, which may be relevant in determining whether and/or how to pay a claim.

Another type of decision that may be made based on data from a data recorder is a subrogation decision 214. For example, as the previously-described earthquake/fire example shows, the cause of a building's damage or destruction may be ambiguous. Whether to pay a claim is one type of decision that may be made based on how destruction and/or damage occurred, but another decision is whether to subrogate the claim. For example, property insurance may cover losses by fire and flood, but flood losses may be covered by a government insurance program and may be subrogatable. If a building collapses in a hurricane, it may be unclear whether the building collapsed from wind or from floodwaters, and yet this distinction may determine whether to subrogate the claim. Data from a data recorder may be used to make such a decision.

Another type of decision that may be made based on data from a data recorder is an underwriting decision 216. For example, an insurance company may collect data about a house, and may use this data to determine whether to continue insuring that house, or to set the premium for insuring the house. Or, data about houses in a geographic area may be collected, and the insurance company may use this data to determine the general level of risk in the area. For example, if analysis of the data from fifty houses in a particular geographic location shows that average wind speed has been increasing over the past few years, then the insurance company may use this information to determine that the likelihood of losses due to wind damage is increasing, and may make coverage and/or premium pricing decision accordingly.

Another type of decision that may be made based on data from a data recorder is a reinsurance decision 218. As previously discussed, the data may be used in making underwriting decisions. Along the same lines, an insurance company may use this data to determine how much re-insurance to purchase. If analysis of the data from the data recorder indicates that the insurance company's expected loss will exceed the company's tolerance for absorbing the losses, then the company may choose to purchase reinsurance. Thus, reinsurance decisions are yet another type of decision that may be made based on data from a data recorder.

Another type of decision that may be made based on data from a data recorder is an alert decision 220. For example, if prospective analysis of collected data indicates that a house is at risk for some type of damage (e.g., foundation cracking, due to rotting caused by high humidity), an alert may be issued to the building owner in order to encourage the owner to take remedial action.

Figure 3:
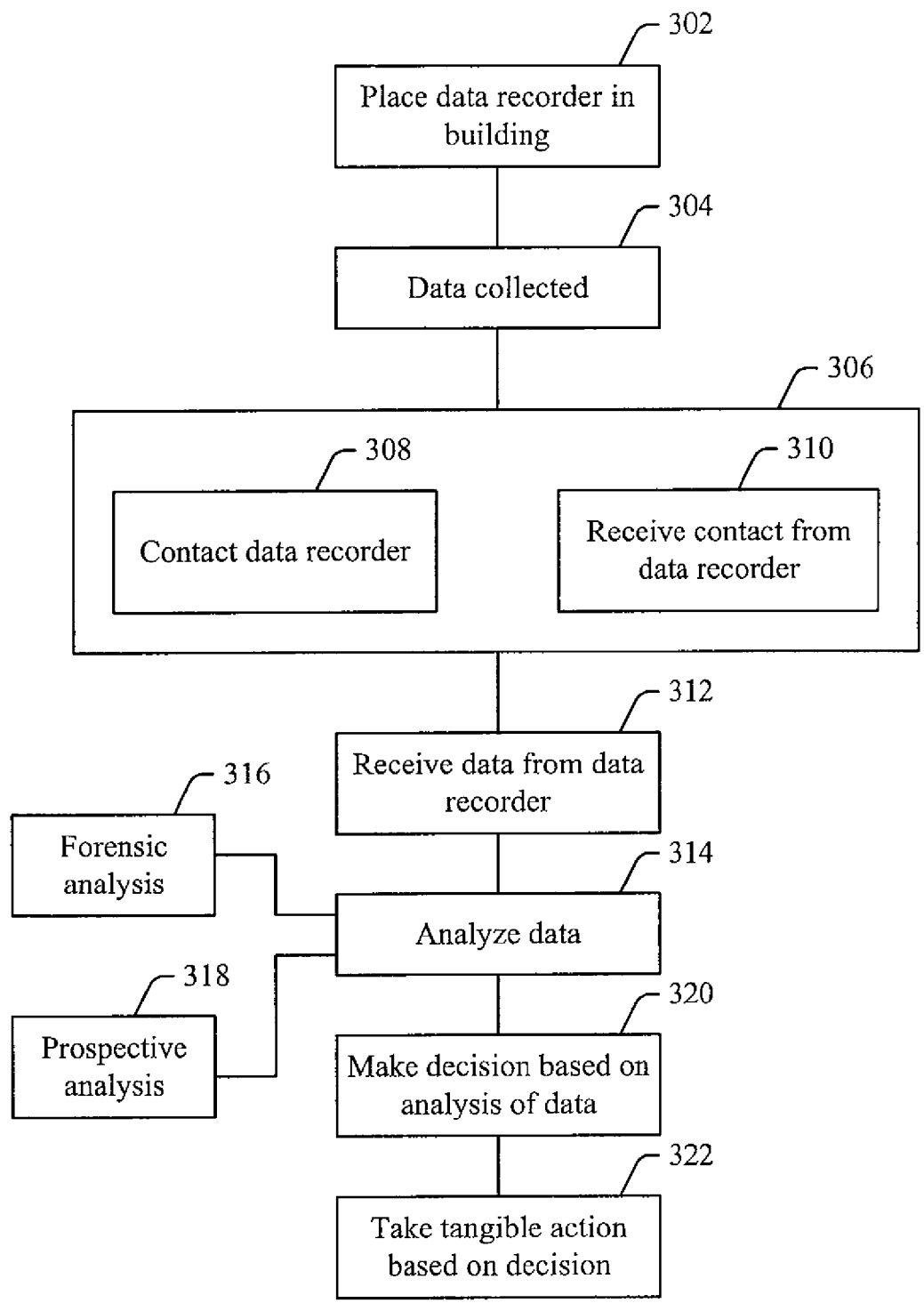
FIG. 3 is a flow diagram of an example process in which data may be recorded and used.

FIG. 3 shows, in the form of a flow chart, an example process in which data may be recorded and used. Before turning to a description of FIG. 3, it is noted that the flow diagram shown therein is described, by way of example, with reference to components shown in FIGS. 1 and 2, although this process may be carried out in any system and is not limited to the scenario shown in FIGS. 1 and 2. Additionally, the flow diagrams in FIG. 3 shows an example in which stages of a process are carried out in a particular order, as indicated by the lines connecting the blocks, but the various stages shown in this diagram can be performed in any order, or in any combination or sub-combination.

At 302, a data recorder may be placed in a building. For example, data recorder 102 may be placed in house 104, as shown in FIG. 1 (although any type or number of data recorders could be placed in any type of building).

At 304, the recorder collects data. Mechanism by which the recorder may collect data have been previously described in connection with FIG. 1.

At 306, contact is made between the data recorder and a mechanism that collects data from the recorder. An example of such a mechanism is data collection machine 126 (shown in FIG. 1), although the subject matter herein is not limited to this example. As previously described, contact between the data recorder and a collection mechanism may be initiated when the collection mechanism contacts the data recorder (at 308), or when the mechanism receives a contact request from the data recorder (at 310).

At 312, following the initial contact between the recorder and the collection mechanism, the collection mechanism may receive data from the recorder. At 314, the data may be analyzed. As noted previously in connection with FIG. 2, the analysis may include a forensic analysis (at 316) and/or a prospective analysis (at 318). At 320, a decision may be made based on the analysis that has been performed. Examples of such decisions, and examples of techniques that may be used in making such decisions, have been described previously in connection with FIG. 2. At 322, a tangible action may be taken based on the decision that is made. For example, if prospective analysis indicates that a building may be heading toward damage, an alert could be issued and communicated to the building's owner, and the owner could take remedial action such as affecting a physical condition present at the building (e.g., reducing the temperature and/or humidity level, installing new equipment in the building, repairing an existing physical condition in the building, etc.).

Figure 4:
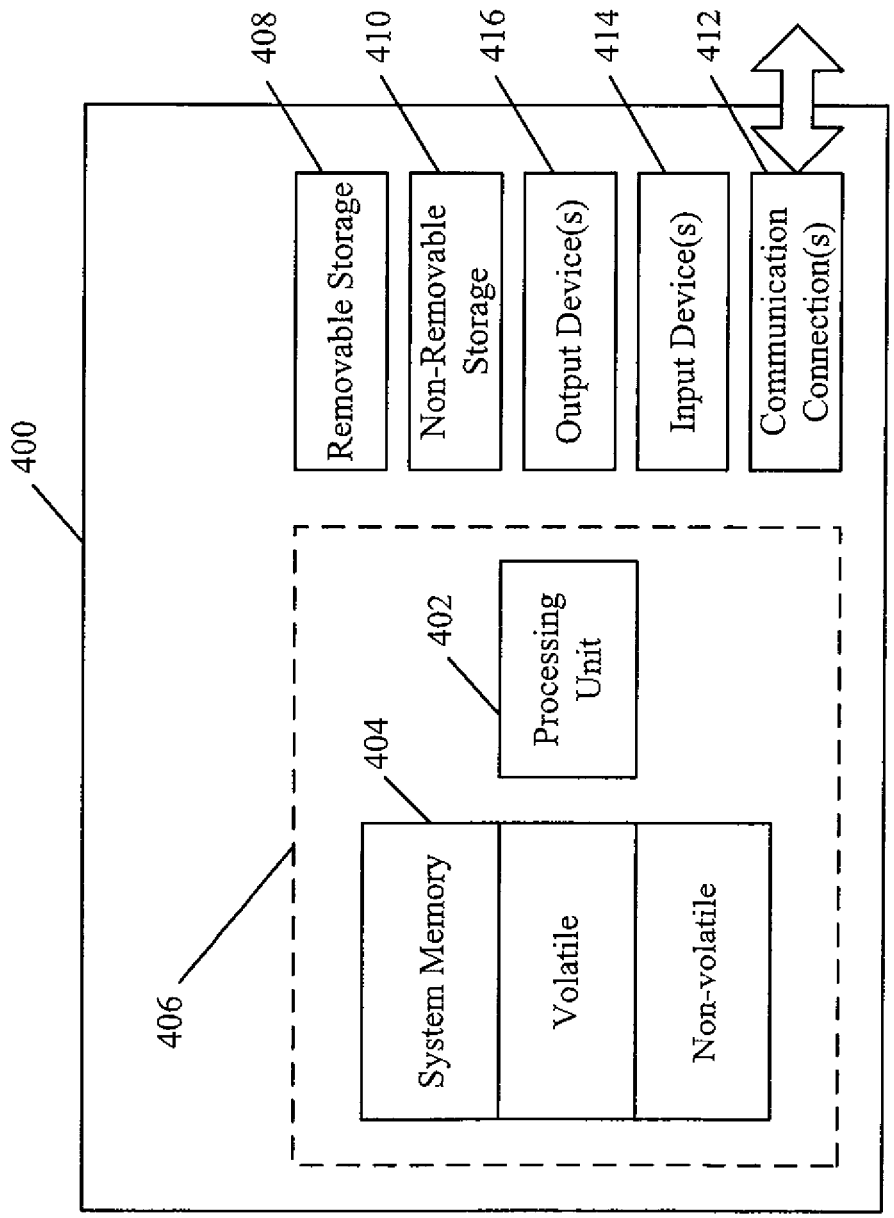
FIG. 4 is a block diagram of an example computing environment that may be used in connection with implementations of the subject matter described herein.

The subject matter described herein may be implemented through the use of a computer system, or other type of device that has some computing mechanism(s). FIG. 4 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an example system for implementing aspects described herein includes a computing device, such as computing device 400. In its most basic configuration, computing device 400 typically includes at least one processing unit 402 and memory 404. Depending on the exact configuration and type of computing device, memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features/functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer readable media. Computer readable media can be any available media that can be accessed by computing device 400 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 404, removable storage 408, and non-removable storage 410 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communications connection(s) 412 that allow the device to communicate with other devices. Communications connection(s) 412 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising instructions stored thereon executable by a processor to:
   communicate with a data recorder installed in a building at least partially covered by an insurance policy;
   receive data collected by the data recorder, the data representing at least one physical condition present at the building;
   analyze the data, wherein analyzing includes comparing the data to data collected by another data recorder installed in another building and representing the at least one physical condition at the other building;
   issue an alert to an owner of the building based on the at least one physical condition present at the building; and
   take a tangible action based on the analysis.

2. The system of claim 1, wherein the instructions include instructions executable to initiate the communication with the data recorder.

3. The system of claim 1, wherein the instructions include instructions executable to communicate responsive to receiving a request for the communication from the data recorder.

4. The system of claim 1, wherein the data recorder includes or uses a temperature sensor, and wherein the physical condition includes a temperature present inside or outside the building.

5. The system of claim 1, wherein the data recorder includes a wind speed sensor, and wherein the physical condition includes a wind speed present at the building.

6. The system of claim 1, wherein the data recorder includes a dock, and wherein the data include timestamps indicating times at which the data were collected.

7. The system of claim 1, wherein the data recorder includes, or makes use of:
   a sensor that records a condition of a plumbing system present at the building; or a sensor that records a condition of an electrical system present at the building.

8. A non-transitory computer-readable medium comprising instructions stored thereon executable by a processor to:
receive data from a data recorder located at a building at least partially covered by an insurance policy, said data representing one or more physical conditions present at the building;
analyze the data to determine:
a risk of damage present at the building; and
a cause of the damage;
wherein analyzing includes comparing the data to data collected by another data recorder located at another building and representing the one or more physical conditions present at the other building; and
make a decision associated with whether to issue an alert to an owner of the building based on the risk of damage.

9. The system of claim 8, wherein the building has been destroyed, and wherein the analysis comprises a forensic analysis to determine a cause of destruction of the building.

10. The system of claim 8, wherein the analysis comprises a forensic analysis to determine a behavior of the building under a set of physical conditions.

11. The system of claim 8, wherein the instructions include instructions executable to analyze the data to determine a resistance of the building to wind, and wherein the data include information about wind speed present at the building.

12. The system of claim 8, wherein the instructions include instructions executable to analyze the data to determine a risk of mold, or of decay of the building, and wherein the data include information collected by a temperature sensor and a humidity sensor.

13. The system of claim 8, wherein the instructions include instructions executable to analyze the data to determine a risk of future wind damage to the building, and wherein the data include information associated with wind speed present at the building during a particular period of time.

14. The system of claim 8, wherein the instructions include instructions executable to analyze the data and data collected from at least one additional building to determine physical conditions present in a vicinity of the building.

15. A system, comprising:
a data recorder configured to gather data associated with a plurality of physical conditions present at a budding;
another data recorder configured to gather data associated with the plurality of physical conditions present at another building; and
a computing device, configured to:
receive the data from the data recorders;
analyze the data, wherein analyzing includes comparing the data to data collected by the another data recorder installed in another building and representing the at least one physical condition at the other building;
determine a cause of a past damage to the building based on the data;
determine a risk of a future damage to the building based on the data; and
take a tangible action based on at least one of the determined cause of the past damage and the determined risk of the future damage.

16. The system of claim 15, wherein the computing device is configured to determine whether to pay an insurance claim for the past damage of the building, based on the determined cause of the past damage.

17. The system of claim 15, wherein the computing device is configured to determine whether to subrogate a claim for the past damage to the building based on the determined cause of the past damage.

18. The system of claim 15, wherein the computing device is configured to determine whether to underwrite an insurance policy on the building based on the determined risk of the future damage.

19. The system of claim 15, wherein the computing device is configured to determine a price at which to insure the building based on the determined risk of the future damage.

20. The system of claim 15, wherein the computing device is configured to determine whether to purchase reinsurance based on the determined risk of the future damage.

* * * * *